United States Patent
Durkee et al.

(10) Patent No.: US 12,236,393 B2
(45) Date of Patent: *Feb. 25, 2025

(54) AUTOMATED STORAGE RETRIEVAL SYSTEM CONNECTION AND COMMUNICATION PROTOCOL

(71) Applicant: Walmart Apollo, LLC, Bentonville, AR (US)

(72) Inventors: Paul Edward Durkee, Centerton, AR (US); Stuart William Clark, Centerton, AR (US); Colin Holmes, Bentonville, AR (US); Jason D. Shaffer, Rogers, AR (US); Mark R. Ibbotson, Bentonville, AR (US); John Suarez, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,141

(22) Filed: Dec. 19, 2023

(65) Prior Publication Data

US 2024/0119405 A1    Apr. 11, 2024

Related U.S. Application Data

(63) Continuation of application No. 17/826,568, filed on May 27, 2022, now Pat. No. 11,893,530, which is a
(Continued)

(51) Int. Cl.
*G06Q 10/0836* (2023.01)
*A47F 10/02* (2006.01)
(Continued)

(52) U.S. Cl.
CPC ......... *G06Q 10/0836* (2013.01); *A47F 10/02* (2013.01); *A47G 29/141* (2013.01);
(Continued)

(58) Field of Classification Search
CPC ... G06Q 10/0836; A47F 10/02; A47G 29/141; A47G 2029/146; B65G 1/1371;
(Continued)

(56) References Cited

U.S. PATENT DOCUMENTS

| 3,737,057 A | 6/1973 | Neumann |
| 5,065,872 A | 11/1991 | Simon |

(Continued)

FOREIGN PATENT DOCUMENTS

| CN | 106942915 A | 7/2017 |
| CN | 107346590 | 11/2017 |

(Continued)

OTHER PUBLICATIONS

U.S. Appl. No. 18/545,149, filed Dec. 19, 2023, Durkee Paul Edward.

(Continued)

*Primary Examiner* — Thomas Randazzo
(74) *Attorney, Agent, or Firm* — Fitch, Even, Tabin & Flannery, LLP

(57) ABSTRACT

Systems, method and computer readable medium are provided for automated storage and retrieval. User authentication information is received via a user interface for a dynamic storage and retrieval device. The user identity is verified based upon the authentication information and previously stored authentication data. Order information is retrieved for an order associated with the user following the verifying of user identity, the order information indicating one or more locations for items associated with the order. Instructions are transmitted to initiate a physical opening of at least one of the dynamic storage and retrieval device and at least one static storage location to enable the user to retrieve at least one item of the order, the static storage location including a controller controlling a locking mecha- (Continued)

nism and communicatively coupled to the dynamic storage and retrieval device.

18 Claims, 8 Drawing Sheets

Related U.S. Application Data continuation of application No. 16/510,151, filed on Jul. 12, 2019, now abandoned.

(60) Provisional application No. 62/697,124, filed on Jul. 12, 2018.

(51) Int. Cl.
| | | |
|---|---|---|
| *A47G 29/14* | (2006.01) | |
| *B25J 9/16* | (2006.01) | |
| *B65G 1/137* | (2006.01) | |
| *G07C 9/00* | (2020.01) | |
| *G07F 17/12* | (2006.01) | |
| *H04W 12/06* | (2021.01) | |
| *H04W 12/08* | (2021.01) | |
| *H04W 48/08* | (2009.01) | |

(52) U.S. Cl.
CPC ....... *B65G 1/1371* (2013.01); *G07C 9/00309* (2013.01); *G07C 9/00571* (2013.01); *G07F 17/12* (2013.01); *H04W 12/06* (2013.01); *H04W 12/08* (2013.01); *H04W 48/08* (2013.01); *A47G 2029/146* (2013.01); *B25J 9/1687* (2013.01)

(58) Field of Classification Search
CPC . G07C 9/00309; G07C 9/00571; G07F 17/12; H04W 12/06; H04W 12/08; H04W 48/08; B25J 9/1687
See application file for complete search history.

(56) References Cited

U.S. PATENT DOCUMENTS

| | | | |
|---|---|---|---|
| 5,337,920 | A | 8/1994 | Clausen |
| 5,478,182 | A | 12/1995 | Hildebrand |
| 5,568,393 | A | 10/1996 | Ando |
| 5,593,269 | A | 1/1997 | Bernard, II |
| 5,674,040 | A | 10/1997 | Wagner |
| 6,224,313 | B1 | 5/2001 | Fukushima |
| 6,325,775 | B1 | 12/2001 | Thom |
| 6,409,449 | B1 | 6/2002 | Freudelsperger |
| 6,416,270 | B1 | 7/2002 | Steury |
| 6,443,317 | B1 | 9/2002 | Brozak, Jr. |
| 6,598,829 | B2 | 7/2003 | Kamstra |
| 6,694,217 | B2 | 2/2004 | Bloom |
| 6,783,058 | B2 | 8/2004 | Quaintance |
| 6,845,873 | B1 | 1/2005 | Chattey |
| 6,882,269 | B2 | 4/2005 | Moreno |
| 7,010,501 | B1 | 3/2006 | Roslak |
| 7,013,198 | B2 | 3/2006 | Haas |
| 7,086,558 | B1 | 8/2006 | Pixley |
| 7,106,202 | B2 | 9/2006 | Dickinson |
| 7,324,921 | B2 | 1/2008 | Sugahara |
| 7,360,042 | B2 | 4/2008 | Chen |
| 7,870,029 | B2 | 1/2011 | Bates |
| 8,145,351 | B2 | 3/2012 | Schininger |
| 8,502,644 | B1 | 8/2013 | Newman |
| 8,560,406 | B1 | 10/2013 | Antony |
| 8,755,930 | B2 | 6/2014 | Miller |
| 8,882,432 | B2 | 11/2014 | Bastianii |
| 8,920,098 | B2 | 12/2014 | Hänel |
| 9,052,992 | B2 | 6/2015 | Irwin |
| 9,082,247 | B2 | 7/2015 | Turner |
| 9,120,524 | B2 | 9/2015 | Ozaki |
| 9,120,624 | B1 | 9/2015 | Cassady |
| 9,230,230 | B2 | 1/2016 | Gupta |
| 9,242,810 | B2 | 1/2016 | Lossov |
| 9,443,372 | B2 | 9/2016 | Mockus |
| 9,482,522 | B2 | 11/2016 | Motoyama |
| 9,516,974 | B2 | 12/2016 | Herling |
| 9,517,296 | B2 | 12/2016 | Fulkerson |
| 9,604,259 | B2 | 3/2017 | Lossov |
| 9,646,280 | B2 | 5/2017 | Thomas |
| 9,821,960 | B2 | 11/2017 | Issing |
| 9,830,572 | B2 | 11/2017 | Wan |
| 9,984,520 | B1 * | 5/2018 | Heller ................ H04W 4/80 |
| 10,019,593 | B1 | 7/2018 | Patel |
| 10,019,693 | B2 | 7/2018 | Wolf |
| 10,043,151 | B1 | 8/2018 | Zhu |
| 10,114,996 | B2 | 10/2018 | Lossov |
| 10,187,542 | B1 | 1/2019 | Fielding |
| 10,303,133 | B1 | 5/2019 | Dhalla |
| 10,357,804 | B2 | 7/2019 | Must |
| 10,621,401 | B2 | 4/2020 | Lossov |
| 11,397,910 | B2 | 7/2022 | Durkee |
| 11,893,530 | B2 * | 2/2024 | Durkee .............. G07F 17/12 |
| 2002/0032501 | A1 | 3/2002 | Tilles |
| 2002/0035515 | A1 | 3/2002 | Moreno |
| 2002/0165787 | A1 | 11/2002 | Bates |
| 2003/0038097 | A1 | 2/2003 | Palder |
| 2003/0046166 | A1 | 3/2003 | Liebman |
| 2003/0065421 | A1 | 4/2003 | Didriksen |
| 2003/0065898 | A1 | 4/2003 | Flamma |
| 2003/0093333 | A1 | 5/2003 | Veeneman |
| 2004/0037680 | A1 | 2/2004 | Sato |
| 2004/0069572 | A1 | 4/2004 | Jaspers |
| 2004/0175258 | A1 | 9/2004 | Haas |
| 2004/0238326 | A1 | 12/2004 | Lichti |
| 2004/0260665 | A1 | 12/2004 | Hamilton |
| 2005/0000974 | A1 | 1/2005 | Chirnomas |
| 2005/0021173 | A1 | 1/2005 | Pinney |
| 2005/0038712 | A1 | 2/2005 | Veeneman |
| 2005/0053450 | A1 | 3/2005 | Kantola |
| 2005/0211768 | A1 | 9/2005 | Stillman |
| 2006/0045660 | A1 | 3/2006 | Di Rosa |
| 2007/0025830 | A1 | 2/2007 | Solomon |
| 2007/0032903 | A1 | 2/2007 | Tsujimoto |
| 2007/0150375 | A1 | 6/2007 | Yang |
| 2007/0187183 | A1 | 8/2007 | Saigh |
| 2007/0284442 | A1 | 12/2007 | Herskovitz |
| 2007/0293978 | A1 | 12/2007 | Wurman |
| 2008/0135574 | A1 | 6/2008 | Hieb |
| 2008/0260504 | A1 | 10/2008 | Gifford |
| 2009/0211962 | A1 | 8/2009 | Min |
| 2010/0076591 | A1 | 3/2010 | Lert, Jr. |
| 2010/0138037 | A1 | 6/2010 | Adelberg |
| 2010/0253190 | A1 | 10/2010 | Li |
| 2011/0178633 | A1 | 7/2011 | Marrese |
| 2012/0024160 | A1 | 2/2012 | Van Os |
| 2012/0027547 | A1 | 2/2012 | Jager |
| 2012/0123587 | A1 | 5/2012 | Mockus |
| 2012/0303154 | A1 | 11/2012 | Stiernagle |
| 2013/0092700 | A1 | 4/2013 | Braunstein |
| 2013/0131863 | A1 | 5/2013 | Hoersten |
| 2013/0167311 | A1 | 7/2013 | Johnson |
| 2013/0184854 | A1 | 7/2013 | Bastian, II |
| 2013/0238115 | A1 | 9/2013 | Smith |
| 2014/0021253 | A1 | 1/2014 | Carson |
| 2014/0037404 | A1 | 2/2014 | Hancock |
| 2014/0079518 | A1 | 3/2014 | Qi |
| 2014/0089085 | A1 | 3/2014 | Mueller |
| 2014/0100942 | A1 | 4/2014 | Konevic |
| 2014/0190914 | A1 | 7/2014 | Nagel |
| 2014/0278603 | A1 | 9/2014 | Lievens |
| 2014/0316916 | A1 | 10/2014 | Hay |
| 2014/0330603 | A1 | 11/2014 | Corder |
| 2015/0032252 | A1 | 1/2015 | Galluzzo |
| 2015/0034713 | A1 | 2/2015 | Jones |
| 2015/0088307 | A1 | 3/2015 | Ackerman |
| 2015/0088731 | A1 | 3/2015 | Ackerman |
| 2015/0106291 | A1 * | 4/2015 | Robinson ......... G06Q 10/0836 |
| | | | 705/339 |
| 2015/0106295 | A1 | 4/2015 | Robinson |

(56) References Cited

U.S. PATENT DOCUMENTS

| | | | |
|---|---|---|---|
| 2015/0106296 A1 | 4/2015 | Robinson | |
| 2015/0120094 A1 | 4/2015 | Kimchi | |
| 2015/0120602 A1 | 4/2015 | Huffman | |
| 2015/0158679 A1 | 6/2015 | Remi | |
| 2015/0186840 A1 | 7/2015 | Torres | |
| 2015/0265124 A1 | 9/2015 | Chen | |
| 2015/0266672 A1 | 9/2015 | Lert | |
| 2015/0310694 A1 | 10/2015 | Will | |
| 2015/0339625 A1* | 11/2015 | Agasti | G06Q 10/0836 |
| | | | 705/26.81 |
| 2015/0343494 A1 | 12/2015 | Lossov | |
| 2015/0356664 A1 | 12/2015 | Mackler | |
| 2015/0371187 A1* | 12/2015 | Irwin | G06Q 50/60 |
| | | | 705/72 |
| 2015/0379464 A1 | 12/2015 | Turner | |
| 2015/0379554 A1 | 12/2015 | Copeland | |
| 2016/0125508 A1 | 5/2016 | Carr | |
| 2016/0130086 A1 | 5/2016 | Yamashita | |
| 2016/0194152 A1 | 7/2016 | Lo Iacono | |
| 2016/0229633 A1 | 8/2016 | Yamashita | |
| 2016/0236865 A1 | 8/2016 | Altemir | |
| 2016/0247702 A1 | 8/2016 | Adachi | |
| 2016/0327941 A1 | 11/2016 | Stiernagle | |
| 2017/0010609 A1 | 1/2017 | High | |
| 2017/0073159 A1 | 3/2017 | Lossov | |
| 2017/0088355 A1 | 3/2017 | Khodl | |
| 2017/0091704 A1 | 3/2017 | Wolf | |
| 2017/0091710 A1 | 3/2017 | Van Dyke | |
| 2017/0124547 A1 | 5/2017 | Natarajan | |
| 2017/0147975 A1 | 5/2017 | Natarajan | |
| 2017/0200117 A1 | 7/2017 | High | |
| 2017/0323250 A1 | 11/2017 | Lindbo | |
| 2018/0014438 A1 | 1/2018 | Bilato | |
| 2018/0041493 A1* | 2/2018 | Wilkinson | H04L 63/08 |
| 2018/0060800 A1* | 3/2018 | Robinson | G07C 9/00571 |
| 2018/0060812 A1* | 3/2018 | Robinson | G06Q 10/1093 |
| 2018/0068139 A1 | 3/2018 | Aalund | |
| 2018/0089619 A1 | 3/2018 | High | |
| 2018/0121872 A1 | 5/2018 | Walsh | |
| 2018/0121873 A1 | 5/2018 | Walsh | |
| 2018/0130017 A1 | 5/2018 | Gupte | |
| 2018/0135337 A1 | 5/2018 | Johnson | |
| 2018/0144296 A1 | 5/2018 | Engel | |
| 2018/0172799 A1 | 6/2018 | Meadow | |
| 2018/0174101 A1 | 6/2018 | Mattingly | |
| 2018/0177318 A1* | 6/2018 | Chambers | E05B 47/02 |
| 2018/0186454 A1 | 7/2018 | Luckay | |
| 2018/0190062 A1* | 7/2018 | Robinson | G06Q 10/0836 |
| 2018/0244469 A1* | 8/2018 | Testa | G07F 11/165 |
| 2018/0251302 A1 | 9/2018 | Valinsky | |
| 2018/0300679 A1* | 10/2018 | Mahmood | G06Q 10/0836 |
| 2018/0305125 A1* | 10/2018 | Guo | B25J 13/08 |
| 2018/0365641 A1* | 12/2018 | Zhu | G06K 7/1417 |
| 2019/0012639 A1 | 1/2019 | Boothman | |
| 2019/0024302 A1 | 1/2019 | Jang | |
| 2019/0031441 A1 | 1/2019 | Jin | |
| 2019/0112119 A1 | 4/2019 | Alexander | |
| 2019/0114585 A1* | 4/2019 | Fee | G06Q 10/0836 |
| 2019/0114859 A1* | 4/2019 | Fee | G07C 9/00912 |
| 2019/0147397 A1 | 5/2019 | Hodges | |
| 2019/0188936 A1* | 6/2019 | Sivill | E05F 17/00 |
| 2019/0213540 A1* | 7/2019 | Petroski | G06Q 10/0837 |
| 2019/0220815 A1* | 7/2019 | Nelson | H04W 4/14 |
| 2019/0313828 A1* | 10/2019 | Schmider | E05G 1/024 |
| 2019/0337719 A1 | 11/2019 | Tovey | |
| 2019/0344965 A1 | 11/2019 | Wilkinson | |
| 2019/0352095 A1 | 11/2019 | Tovey | |
| 2019/0370744 A1* | 12/2019 | Fee | G07G 1/0063 |
| 2019/0375594 A1 | 12/2019 | Tovey | |
| 2020/0002093 A1 | 1/2020 | Tovey | |
| 2020/0005226 A1 | 1/2020 | Sikka | |
| 2020/0012245 A1* | 1/2020 | Marin Pulido | G06Q 10/0836 |
| 2020/0017298 A1 | 1/2020 | Durkee | |
| 2020/0017299 A1 | 1/2020 | Durkee | |
| 2020/0017300 A1 | 1/2020 | Durkee | |
| 2020/0019929 A1 | 1/2020 | Chaney | |
| 2020/0172337 A1 | 6/2020 | Wilkinson | |
| 2020/0193373 A1* | 6/2020 | Varman | A47G 29/1225 |
| 2020/0226539 A1 | 7/2020 | Durkee | |
| 2020/0239229 A1 | 7/2020 | Tovey | |
| 2020/0250614 A1 | 8/2020 | Zhu | |
| 2020/0250615 A1* | 8/2020 | Fee | G07C 9/29 |
| 2020/0293990 A1* | 9/2020 | Mak | G06K 7/10366 |
| 2020/0317446 A1 | 10/2020 | Tovey | |
| 2020/0394375 A1 | 12/2020 | Lossov | |
| 2021/0074100 A1* | 3/2021 | Kashi | G06Q 10/0836 |
| 2021/0142277 A1* | 5/2021 | Fee | G07C 9/00571 |
| 2022/0127078 A1 | 4/2022 | Durkee | |
| 2022/0250840 A1 | 8/2022 | Wilkinson | |
| 2022/0306385 A1 | 9/2022 | Tovey | |
| 2022/0309456 A1 | 9/2022 | Durkee | |
| 2023/0394425 A1 | 12/2023 | Chaney | |

FOREIGN PATENT DOCUMENTS

| | | |
|---|---|---|
| CN | 107454863 | 12/2017 |
| CN | 107814122 | 3/2018 |
| DE | 4339056 | 5/1995 |
| EM | 0021045470001 | 9/2012 |
| EM | 0027572450001 | 8/2015 |
| EM | 0027572450002 | 8/2015 |
| EM | 0027572450003 | 8/2015 |
| EM | 0036406890001 | 1/2017 |
| EM | 0037930660001 | 3/2017 |
| EM | 0034029650001 | 7/2017 |
| EM | 0041697610001 | 8/2017 |
| EP | 2881905 | 6/2015 |
| EP | 2950282 | 12/2015 |
| EP | 3142085 | 3/2017 |
| EP | 3255596 | 12/2017 |
| GB | 2175575 A | 12/1986 |
| GB | 2409748 | 7/2005 |
| GB | 2430608 | 4/2007 |
| GB | 2430705 | 4/2007 |
| GB | 2437967 | 11/2007 |
| GB | 2491340 | 12/2012 |
| GB | 2564313 | 1/2019 |
| GB | 2590246 | 6/2021 |
| GB | 2590248 | 6/2021 |
| GB | 2590267 | 6/2021 |
| GB | 2590268 | 6/2021 |
| JP | 2017048014 A | 3/2017 |
| WO | 1995011829 | 5/1995 |
| WO | 1998007641 | 2/1998 |
| WO | 2001018395 | 3/2001 |
| WO | 2001097101 | 12/2001 |
| WO | 2002007021 | 1/2002 |
| WO | 2002074634 | 9/2002 |
| WO | 2003046782 | 6/2003 |
| WO | 2006136108 A1 | 12/2006 |
| WO | 2008104731 | 9/2008 |
| WO | 2015019377 | 2/2015 |
| WO | 2015037923 A1 | 3/2015 |
| WO | 2015044692 | 4/2015 |
| WO | 2016176464 A1 | 11/2016 |
| WO | 2017081550 | 5/2017 |
| WO | 2017163018 | 9/2017 |
| WO | 2019212853 | 11/2019 |
| WO | 2019222246 | 11/2019 |
| WO | 2020014373 | 1/2020 |
| WO | 2020014374 | 1/2020 |
| WO | 2020014608 | 1/2020 |
| WO | 2020014615 | 1/2020 |
| WO | 2020092790 | 5/2020 |
| WO | 2020118227 | 6/2020 |

OTHER PUBLICATIONS

Agarwal, VIvek, Report: Assessing the benefits of Auto-ID Technology in the Consumer Goods Industry, Cambridge University Auto ID center, University of Cambridge. (Year: 2001).

(56) References Cited

OTHER PUBLICATIONS

Benofficial, Walmart's new Cleveron Pickup Machine in action, 3p, Dec. 21, 2017, Youtube, https://www.youtube.com/watch?v=c6amWJISqHO, retrieved Jul. 8, 2020.
Benofficial; "Walmart's new Cleveron pickup machine in action"; <youtube.com>; Dec. 21, 2017; pp. 1-5.
Boeing Invests in Matternet, Matternet, https://mttr.net/, Jun. 26, 2018, 4 pages.
Channel 8 KLKN-TV, Walmart unveils pick up tower, published Jun. 29, 2018, retrieved from <https://www.youtube.com/watch?v=P8HOrzxT6yE> on Jul. 8, 2020, 2 pages.
Click and collect pickup automation for retail and logistics, Cleveron, https://cleveron.eu/, 2018, 5 pages.
Cleveron AS Automated Parcel Machine PackRobot With Smart Storage System. Product Sheet www.cleveron.eu/packrobot. retrieved from web.archive.org/web/20160910094527/http://www.cleveron.eu/packrobot#videosection. Published at least as early as Sep. 10, 2016, 3 pages.
Cleveron AS, Cleveron 10, published Nov. 15, 2017, retrieved from <https://www.youtube.com/watch?v=gz3WrYa1Zbs> on Jul. 8, 2020, 4 pages.
Cleveron AS, Cleveron highlights the lack of drone delivery legislation at Digital Summit Tallinn, Sep. 26, 2017 https://cleveron.com/news/cleveron-digital-summit; 3p.
Cleveron AS, Cleveron Introduction 2016. published Jun. 14, 2016, retrieved from https://www.youtube.com/watch?v=ly4K_yWCXRg on Jul. 8, 2020, 4 pages.
Cleveron AS, Courier loading operations at Cleveron's Parcel Terminal, published Nov. 6, 2012, retrieved from <https://www.youtube.com/watch?v=qgQ0f-bTQ10> on Jul. 8, 2020, 2 pages.
Cleveron AS, Multiload system of Cleveron's PackRobot, published Sep. 26, 2012, retrieved from <https://www.youtube.com/watch?v=l31M3V-8saE> on Jul. 8, 2020, 2 pages.
Cleveron AS, Pack robot Cleveron 401, 5p, Sep. 15, 2015, You-tube, https://www.youtube.com/watch?v=-iyT2hGrFOc, retrieved Jul. 8, 2020.
Cleveron AS, Pack robot Cleveron 401, published Sep. 15, 2015, retrieved from <https://www.youtube.com/watch?v=-iyT2hGrF0c> on Jul. 8, 2020, 2 pages.
Cleveron AS, Smart Post ETV Feb. 28, 2010, published Mar. 16, 2010, retrieved from <https://www.youtube.com/watch?v=K-hNRJGZKEY> on Jul. 8, 2020, 2 pages.
Cleveron AS; SmartPOST ETV Feb. 28, 2010. Mar. 16, 2010, screenshots 2:25, 2:26, 2:35 2p. https://youtu.be/K-hNRJGZKEY, 2 pages.
Cleveron, Automated parcel Machine PackRobot with smart storage system. Product sheet. Published at least as early as Sep. 20, 2016 at www.cleveron.eu/packrobot; and at https://issuu.com/cleveron/docs/pr16002_1_tooteleht on Apr. 10, 2017, 4 pages.
Drew Menard, "New high-tech book retrieval system enhances library resources", Jul. 19, 2013, liberty.edu, 6 pages (Year: 2013).
Hointer, The Hointer Experience. Retrieved online at: https://www.youtube.com/watch?v=i9348H-mw4. 2 pages, Mar. 21, 2014.
Intelligent, Intuitive and Interconnected Vending Machings, SAP Blogs, https://blogs.sap.com/2015/04/16/intelligent-intuitive-and-interconnected-vending-machines/, Apr. 16, 2015, 7 pages.

International Search Report and Written Opinion for Application No. PCT/US2019/041599, dated Sep. 30, 2019, 12 pages.
K. L. Choy G. T. S. Ho . C. K. H. Lee, A RFID-based storage assignment system for enhancing the efficiency of order picking, Published online: Sep. 19, 2014, J Intell Manuf (2017) 28:111-129 (Year: 2014).
Nicole Dube, "E-Cigarettes and Minors", Jan. 19, 2018, cga.ct.gov, 4 pages, (Year: 2018).
PackRobot: robotics based most efficient parcel terminal, Cleveron, http://cleveron.eu/packrobot/#1490003126030-5c15306f-a9f0, 2017, 9 pages.
Palm, Zara tests out a new kiosk designed to hold packages for customers who make online orders. Retrieved online at: https://www.psfk.com/2018/01/zara-self-service-kiosks-online-orders.html. 6 pages, Jan. 2, 2018.
Peterson, Hayley, Walmart is unleashing 2 key weapons against Amazon in 700 stores. 11 Apr. 5, 2018, 11 pages. https://www.businessinsider.com/walmart-online-pickup-tower-review-2017-8.
Peterson, Walmart is building giant towers to solve the most annoying thing about online ordering. Business insider. Retrieved online at: https://www.businessinsider.in. 8 pages, Jul. 5, 2017.
Pipatprapa, Anirut, "QR Code on Mobile Platform for Improving Order Picking Process of Lean Factory Warehouse," 2019, International Journal of Innovation, Management and Technology 10.1 (2019): 56-60. (Year: 2019).
Simplifying Cloud-Connected Vending Machines, Intelligent Vending with Intel® IoT Retail Gateway, https://www.intel.in/content/www/in/en/embedded/retail/vending/iot-gateway-for-intelligent-vending/overview.html, last viewed Aug. 16, 2018, 4 pages.
Smolnikov, Teleitems Robotic Parcel Terminal Promo, https://www.youtube.com/watch? v=mXL_c50T9Rc, published Jul. 21, 2017, 1 page.
Technology Breaking News, Walmart adds 500 Pickup Towers to its stores across the US, published Apr. 27, 2018, retrieved from <https://www.youtube.com/watch?v=wbrw9BEIqrY> on Jul. 8, 2020, 2 pages.
USPTO; U.S. Appl. No. 16/510,151; Final Rejection mailed Jan. 27, 2022; (24 pages).
USPTO; U.S. Appl. No. 16/510,151; Office Action mailed Jun. 15, 2021; (18 pages).
USPTO; U.S. Appl. No. 16/510,151; Office Action mailed Sep. 22, 2021; (21 pages).
USPTO; U.S. Appl. No. 16/510,151; Office Action mailed Dec. 23, 2021; (23 pages).
USPTO; U.S. Appl. No. 17/826,568; Final Rejection mailed Aug. 24, 2023; (pp. 1-25).
USPTO; U.S. Appl. No. 17/826,568; Non-Final Rejection mailed Jun. 16, 2023; (pp. 1-25).
USPTO; U.S. Appl. No. 17/826,568; Notice of Allowance and Fees Due (PTOL-85) mailed Sep. 29, 2023; (pp. 1-13).
Vidmar, Stanley, Tower System provides automated storage and retrieval., Mar. 30, 2005, https://news.thomasnet.com/fullstory/tower-system-provides-automated-storage-and-retrieval-461698 (Year: 2005), 5 pages.
ZDNet, Walmart rolls out 500 more vending machines for online order pickups | ZDNet, published Jun. 3, 2018, retrieved from <https://www.youtube.com/watch?v=WtSnq9_CExY> on Jul. 8, 2020, 2 pages.

* cited by examiner

AUTOMATED STORAGE RETRIEVAL
SYSTEM CONNECTION AND
COMMUNICATION PROTOCOL

RELATED APPLICATION

This application is a continuation of U.S. application Ser. No. 17/826,568, filed May 27, 2022, which is a continuation of U.S. application Ser. No. 16/510,151, filed Jul. 12, 2019 (now abandoned), which claims priority to, and the benefit of, U.S. Provisional App. No. 62/697,124, filed Jul. 12, 2018, the contents of which are incorporated herein by reference in their entirety.

BACKGROUND

Online ordering has resulted in a new shopping experience wherein a customer can order items online then pick the order up in the store. The user doesn't have to traverse through the store, looking for items and wait in a line to check out the items being purchased. Instead, the user can order and pay online at a time that is convenient for the customer. The customer is notified when the order is ready for pickup. An end result is the shopping experience is made more convenient for the customer.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein. In the drawings.

DETAILED DESCRIPTION

Embodiments of the present invention provide a system, method and computer readable medium containing computer instructions for an automated storage and retrieval system. In one embodiment, a storage and retrieval system includes a dynamic storage and retrieval device and at least one static storage location. The dynamic storage and retrieval device includes a user interface configured to receive customer authentication input to enable the customer to gain access to at least one item of an order placed by the customer. The item may be stored in the dynamic storage and retrieval device or a static storage location that is communicatively coupled to the dynamic storage and retrieval device.

Figure 1:
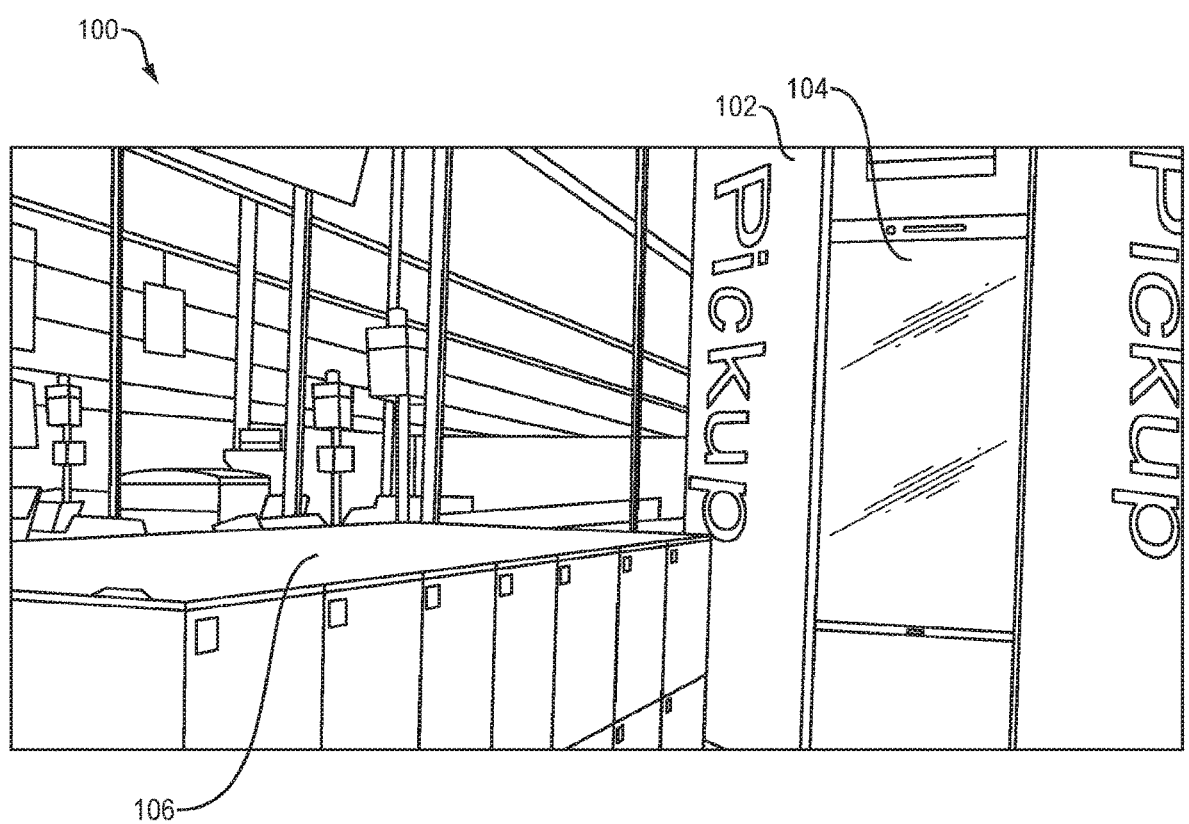
FIG. 1 depicts an automated storage and retrieval system including a dynamic storage and retrieval device and a static storage location, according to an example embodiment.

Referring to FIG. 1, a storage and retrieval system 100 in an exemplary embodiment is shown. The storage and retrieval system in the exemplary embodiment includes a dynamic storage and retrieval device 102 and a static storage location 106. In some embodiments, the dynamic storage and retrieval device 102, may have, but is not limited to, a tower configuration. In other embodiments, the dynamic storage and retrieval device 102 may be another form of storage and retrieval device such as a non-tower shaped devices including mobile robotic devices equipped with automated storage and/or retrieval mechanisms (e.g. a drone, AGV, etc.). In some embodiments, the static storage location 106, may be implemented in, but is not limited to, a locker configuration. In other embodiments, the static storage location may be another type of fixed location such as a room or area secured with a lockable door or opening. The static storage location 106 may be equipped with a controller controlling a lockable opening such as a gate, door or window for the static storage location.

The dynamic storage and retrieval device 102 includes a user interface 104. The user interacts with the automated storage and retrieval system by way of the user interface to enable the system to verify their identity and enable the user to pick up items that were ordered. For example, the user may provide authentication information via the user interface 104 such as by manually entering authentication information or by providing the authentication information wirelessly via a mobile device. In one embodiment, the authentication may be encoded into a machine-readable identifier by a mobile application on the user's mobile device and the machine-readable identifier may be scanned by a scanner in the dynamic storage and retrieval device. In another embodiment, the authentication information may be provided wirelessly to the dynamic storage and retrieval device 102. Once the authentication information has been verified, the items associated with the user's order may be retrieved. The ordered items may be located in the dynamic storage and retrieval device, may be in the static storage location, or in both. In one embodiment, the static storage location may be used to store items of a size greater or less than a size threshold from a customer order. A storage and retrieval system may include a single dynamic storage and retrieval device and one or more static storage locations. Each static storage location may operate independently of any other static storage locations.

The storage and retrieval system also includes at least one computing device executing a storage and retrieval module and at least one database holding user authentication information and information related to items contained in user orders. The computing device(s) executing the storage and retrieval module may be communicatively coupled to the dynamic storage and retrieval device 102 and the controller for the static storage location 106. The storage and retrieval module may receive the user authentication information from the dynamic storage and retrieval device 6102, verify the user's identity using the user authentication information from the database, and then retrieve order information for an order associated with the user following the verifying of the user's identity. The order information may indicate one or more locations for items associated with the order. The storage and retrieval module may transmit instructions to the dynamic storage retrieval device 102 and/or the static storage location to initiate a physical opening of the dynamic storage retrieval device 102 and/or the static storage location so as to enable the user to retrieve the items associated with the order. The storage and retrieval module may also transmit instructions to the dynamic storage and retrieval device 102 to initiate the automatic retrieval of an item from within the dynamic storage and retrieval device 102.

Figure 2:
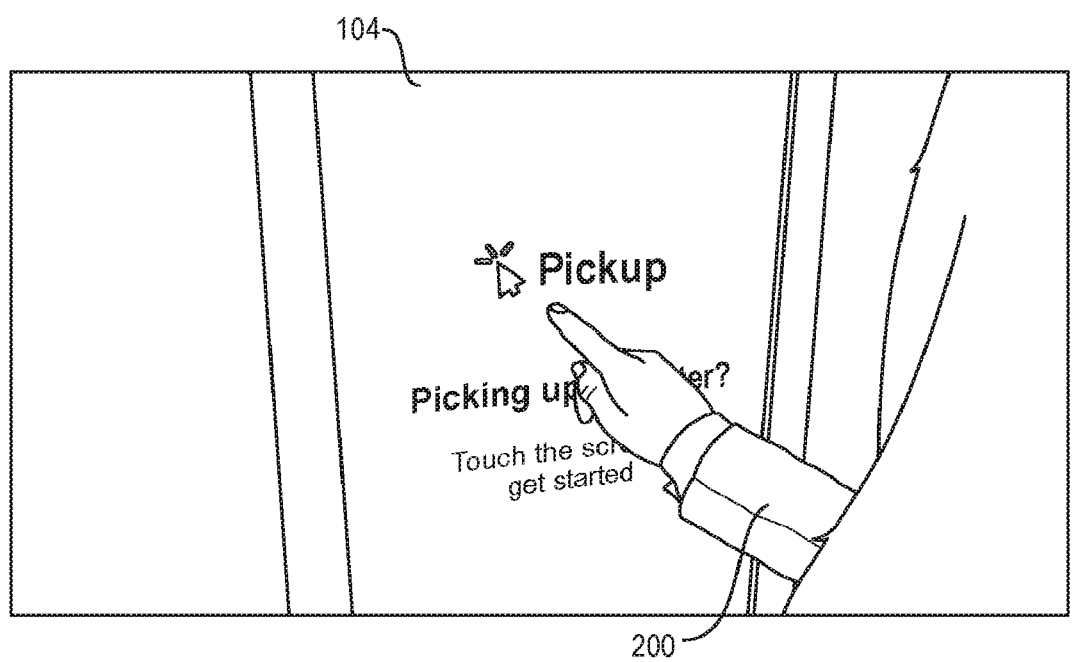
FIG. 2 depicts a user interface of a dynamic storage and retrieval device according to an example embodiment.

FIG. 2 shows a user 200 accessing the user interface 104 in an example embodiment. For example, the user may have previously ordered one or more items online, and received a notification that the order is ready to be picked up in the store. The user may interact with the storage and retrieval system via the user interface 104 to initiate the pickup process.

Figure 3:
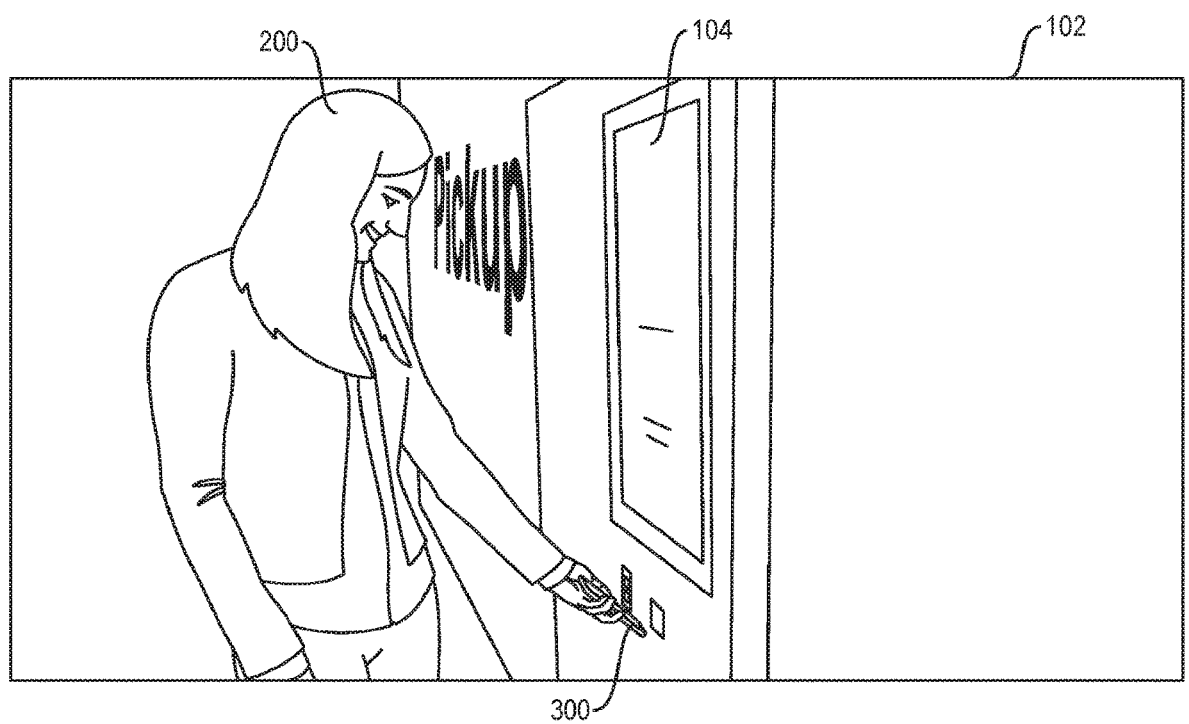
FIG. 3 depicts a user presenting credentials to the user interface of the dynamic storage and retrieval device, according to an example embodiment.

FIG. 3 depicts a user presenting credentials to the user interface of the dynamic storage and retrieval device, according to an example embodiment. The credentials 302 are used to verify the user identification and to identify an order associated with the user. Once the authentication is completed, the storage and retrieval module may transmit instructions to initiate a physical opening of the dynamic storage and retrieval device 102 and/or storage location 106 depending on the location of the items associated with the order. The instructions may cause the opening or may unlock the opening for a period of time to enable a user to retrieve an item. The storage and retrieval module may also transmit instructions to the dynamic storage and retrieval device 102 to initiate the automated retrieval of the items from within the dynamic storage and retrieval device. For example, the dynamic storage and retrieval device 102 may include automated conveyor belts, pushers, and/or retrieval arms or similar mechanisms within the dynamic storage and retrieval device which can be used to move an item from a storage location to the physical opening of the dynamic storage and retrieval device. In one embodiment, for example, a robotic arm may grasp an item and extend the item to a user through the opening. In another embodiment, the item may traverse the opening to the user after being place on a chute or conveyor that extends to the opening.

Figure 4:
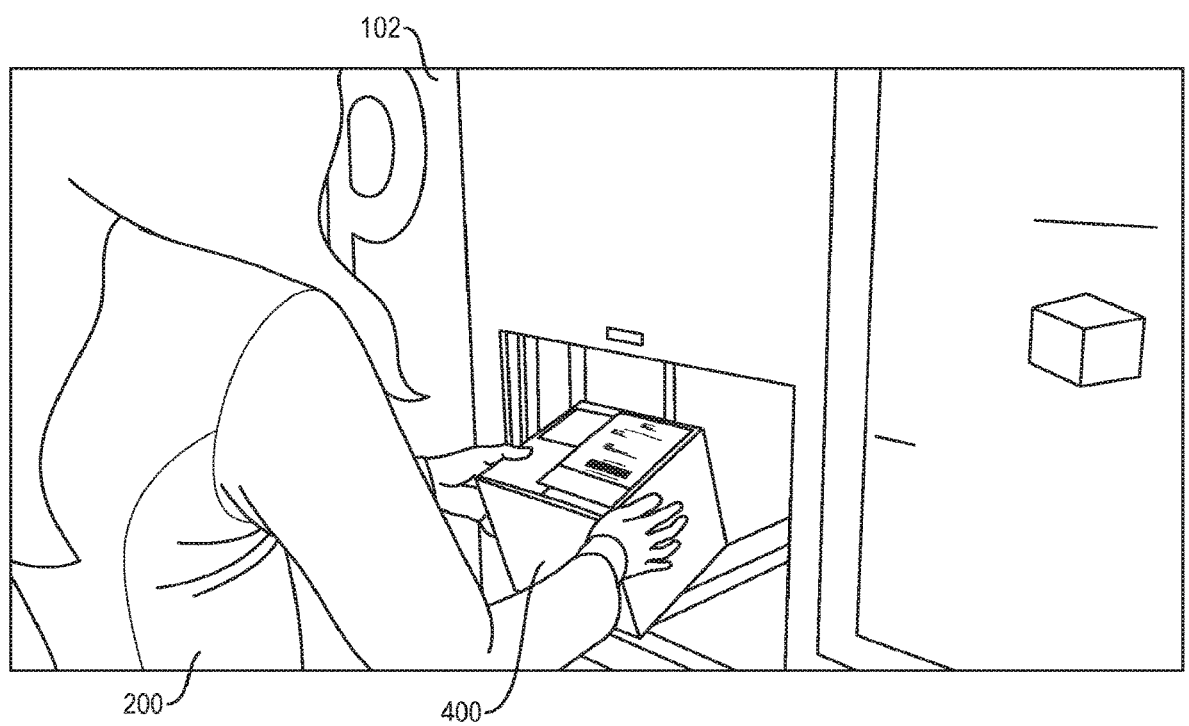
FIG. 4 depicts a user retrieving an item from the dynamic storage and retrieval device according to an example embodiment.
Figure 5:
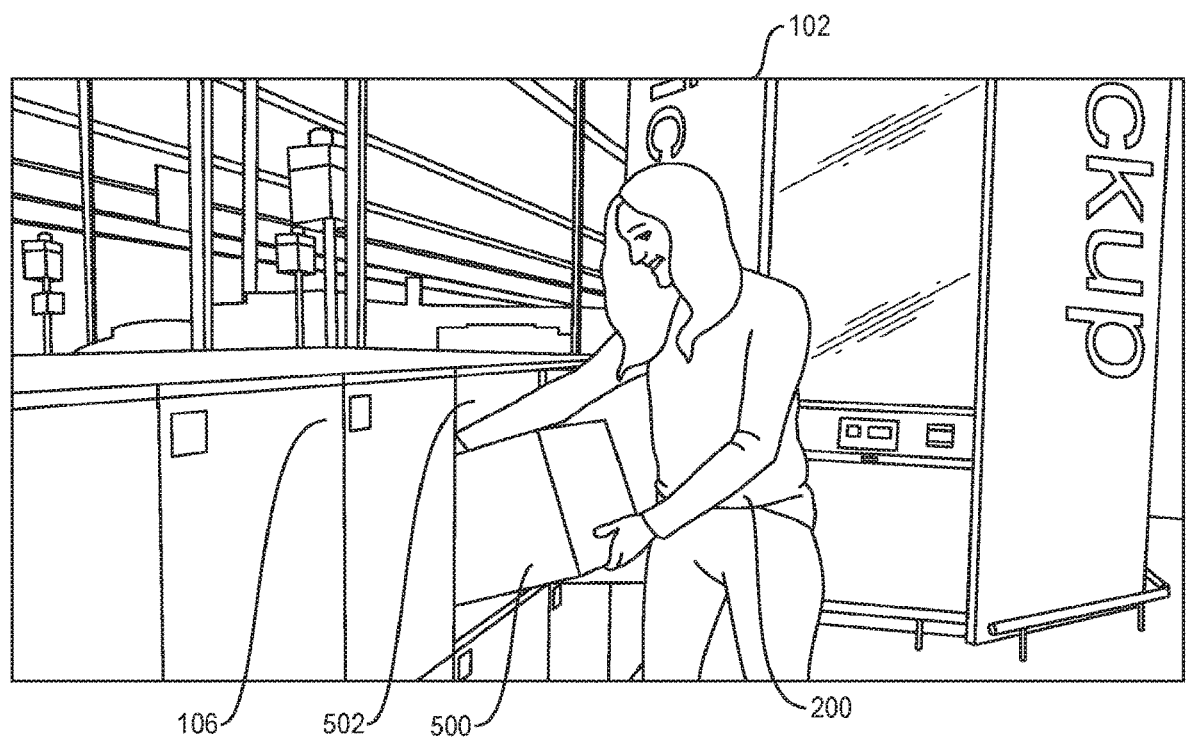
FIG. 5 depicts a user retrieving an item from the static storage location according to an example embodiment.

FIG. 4 depicts the user 200 retrieving an item 400 from an opening in the dynamic storage and retrieval device 102. FIG. 5 shows the same user 200 retrieving a second item 500 of her order from the static storage location 106. The particular storage cabinet/locker 502 is unlocked as a result of the transmitted instruction from the storage and retrieval module to a controller in the static storage location 106 to allow the user 200 access to the cabinet/locker 502.

In one embodiment, the instruction to unlock the opening of the static storage location 106 may be used in combination with a proximity sensor for the static storage location. For example, a proximity sensor disposed at the static storage location may be used to complete the unlocking process only when detecting the presence of a user directly in front of the static storage location when the unlock instruction has already been received from the retrieval and storage module. In one embodiment, the proximity sensor may be communicatively coupled to the storage and retrieval module and/or the controller for the locking mechanism. In another embodiment, a proximity or other sensor may wirelessly interrogate a mobile device of the user to provide an additional level of authentication before unlocking the opening/door/window for the static storage location 106.

Figure 6:
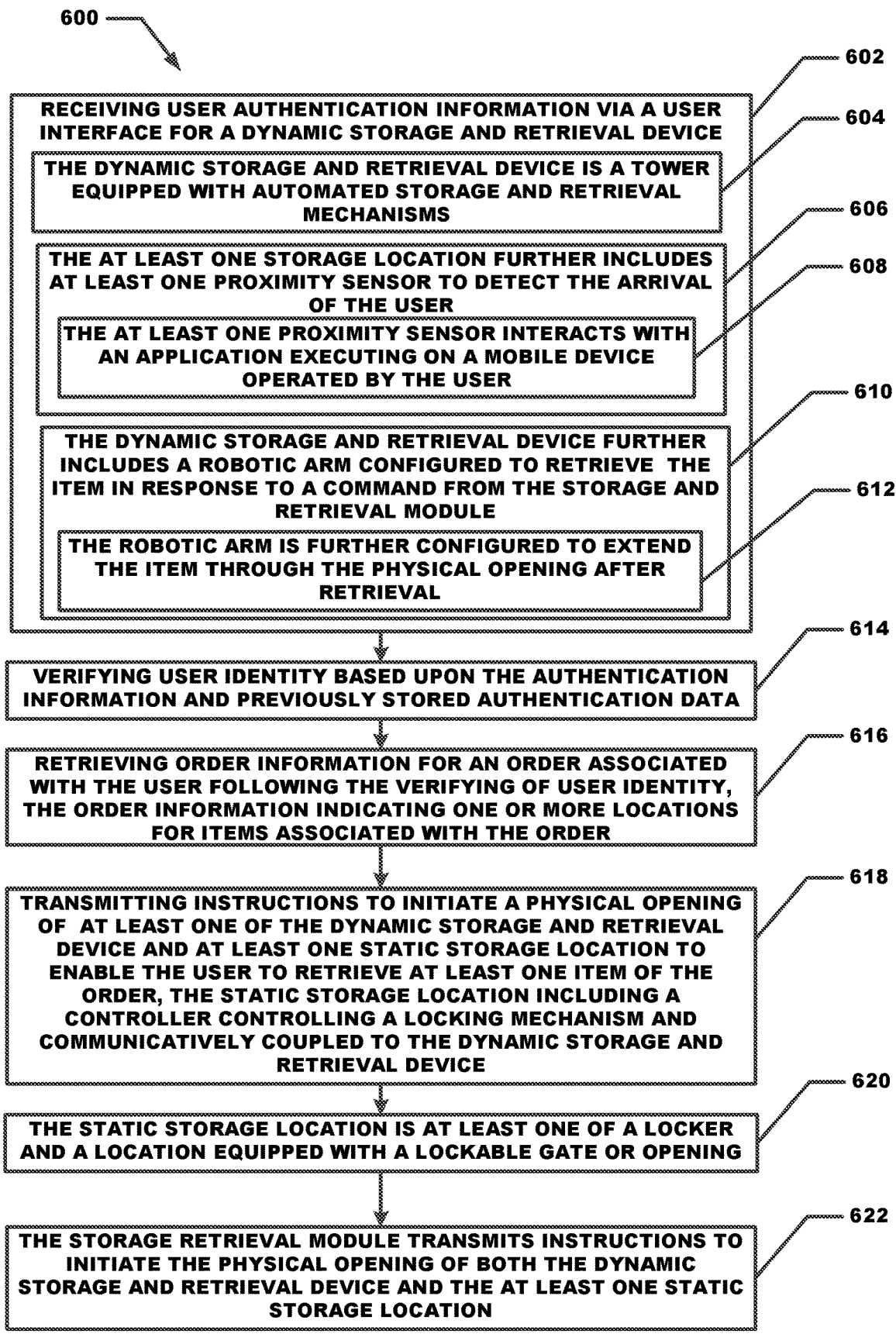
FIG. 6 is a flow diagram illustrating an exemplary method for operating an automated storage and retrieval system, according to an example embodiment.

FIG. 6 is a flow diagram showing illustrative processing that can be implemented within a system for an automated storage and retrieval system in an exemplary embodiment. Rectangular elements are herein denoted "processing blocks" and may represent actions performed at least in part by the execution of computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

FIG. 6 is a flowchart illustrating an exemplary method 600 for operating a storage and retrieval system, according to an example embodiment. Method 600 starts by receiving user authentication information via a user interface for a dynamic storage and retrieval device (STEP 602). In one embodiment, the dynamic storage and retrieval device is a tower equipped with automated storage and retrieval mechanisms (step 604). The at least one storage location further includes at least one proximity sensor to detect the arrival of the user (step 606). In one example, the at least one proximity sensor interacts with an application executing on a mobile device operated by the user (step 608). In a non-limiting embodiment, the dynamic storage and retrieval device further includes a robotic arm configured to retrieve the item in response to a command from the storage and retrieval module (step 610). The robotic arm is further configured to extend the item through the physical opening after retrieval (step 612).

The method continues with the step of verifying user identity based upon the authentication information and previously stored authentication data (step 614). The next step is retrieving order information for an order associated with the user following the verifying of user identity, the order information indicating one or more locations for items associated with the order (step 616).

The method next includes transmitting instructions to initiate a physical opening of at least one of the dynamic storage and retrieval device and at least one static storage location to enable the user to retrieve at least one item of the order, the static storage location including a controller controlling a locking mechanism and communicatively coupled to the dynamic storage and retrieval device (step 618).

The static storage location is at least one of a locker and a location equipped with a lockable gate or opening (step 620. The storage retrieval module transmits instructions to initiate the physical opening of both the dynamic storage and retrieval device and the at least one static storage location.

Figure 7:
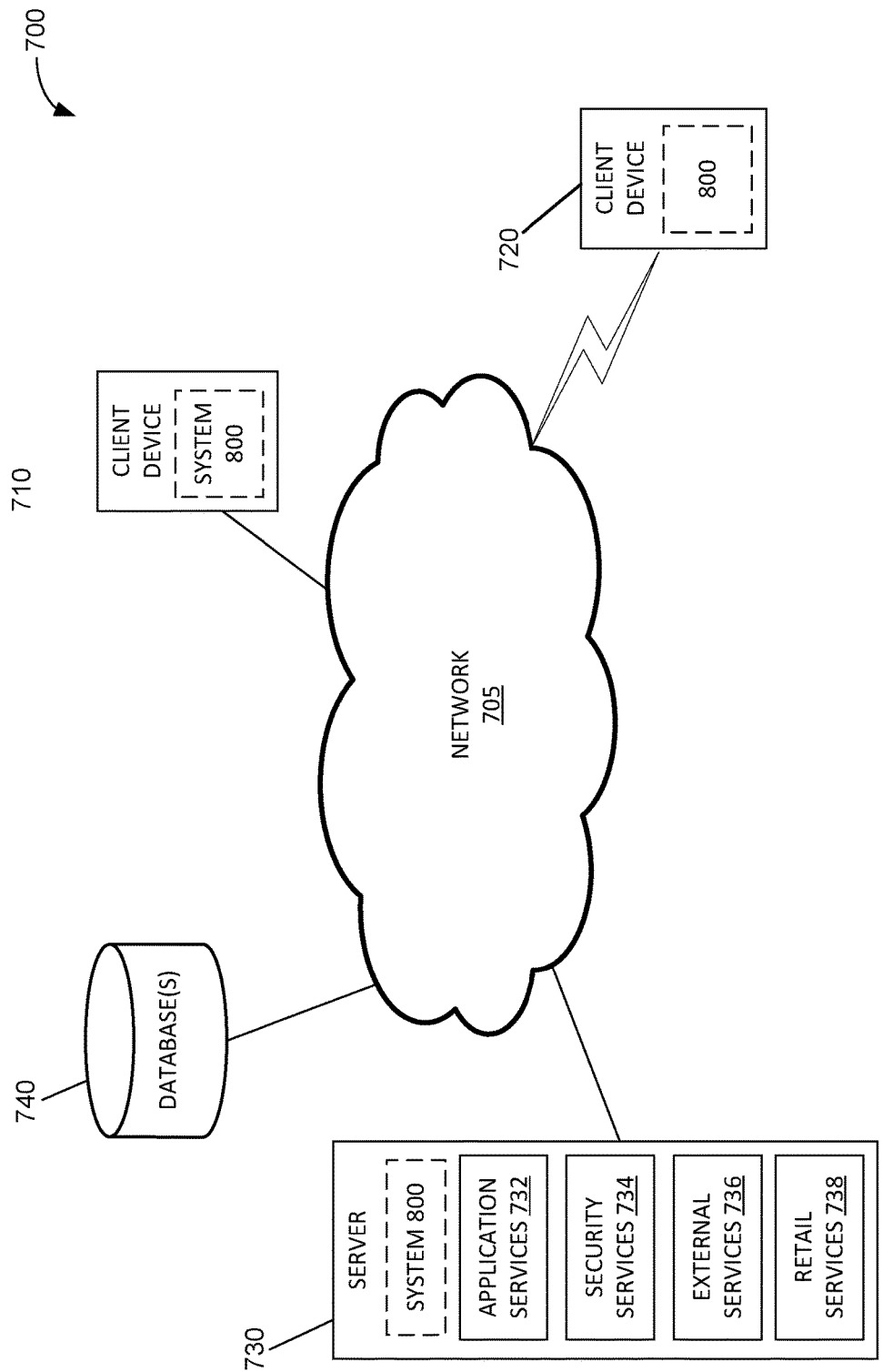
FIG. 7 is a diagram of an exemplary network environment suitable for an automated storage and retrieval system of exemplary embodiments.

FIG. 7 illustrates a network diagram depicting a system 700 for implementing the automated storage and retrieval system, according to an example embodiment. The system 700 can include a network 705, multiple client devices, for example, client device 710, client device 720, a server 730, and database(s) 740. Each of the client devices 710, 720, server 730, and database(s) 740 is in communication with the network 705.

In an example embodiment, one or more portions of network 705 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client devices 710, 720 may comprise, but are not limited to, mobile devices, handheld devices, wireless devices, portable devices, wearable computers, cellular or mobile phones, portable digital assistants (PDAs), smart phones, smart watches, tablets, ultrabooks, netbooks, laptops, desktops, multi-processor systems, microprocessor-based or programmable consumer electronics, and the like. Each of client devices 710, 720 may connect to network 705 via a wired or wireless connection. In an example embodiment, the client devices 710, 720 may perform one or more of the functionalities of the automated storage and retrieval system described herein, or transmit data or signals to the automated storage and retrieval system described herein. The client device 710, 720 can include one or more components of computing device 800 of FIG. 8.

In an example embodiment, the automated storage and retrieval system 100 may be included at least in part on the client device 710, 720, and the client device 710, 720 performs one or more of the functionalities of the system described herein. In an example embodiment, the automated storage and retrieval system may be included at least in part on the server 730, and the server 730 performs one or more of the functionalities of the targeted advertising system described herein.

The database(s) 740 comprise one or more storage devices for storing data and/or instructions (or code) for use by the server 730 and/or the client devices 710, 720. Each of the database(s) 740 and the server 730 is connected to the network 705 via a wired connection. Alternatively, one or more of the database(s) 740 and server 730 may be connected to the network 705 via a wireless connection. The server 730 comprises one or more computers or processors configured to communicate with the client devices 710, 720 via network 705. The server 730 can include one or more components of device 800 of FIG. 8. Server 730 hosts one or more software systems, applications or websites, including one or more components of the dynamic delivery system 100 described herein and/or facilitates access to the content of database(s) 740.

In an example embodiment, the server 730 also includes various software services that facilitate the functionalities of the automated storage and retrieval system. Database(s) 740 and server 730 may be located at one or more geographically distributed locations from each other or from client devices 710, 720. Alternatively, database(s) 740, 745 may be included within server 730. Server 730 may further include application services 732, security services 734, external services 737=6 and retail services 738.

Figure 8:
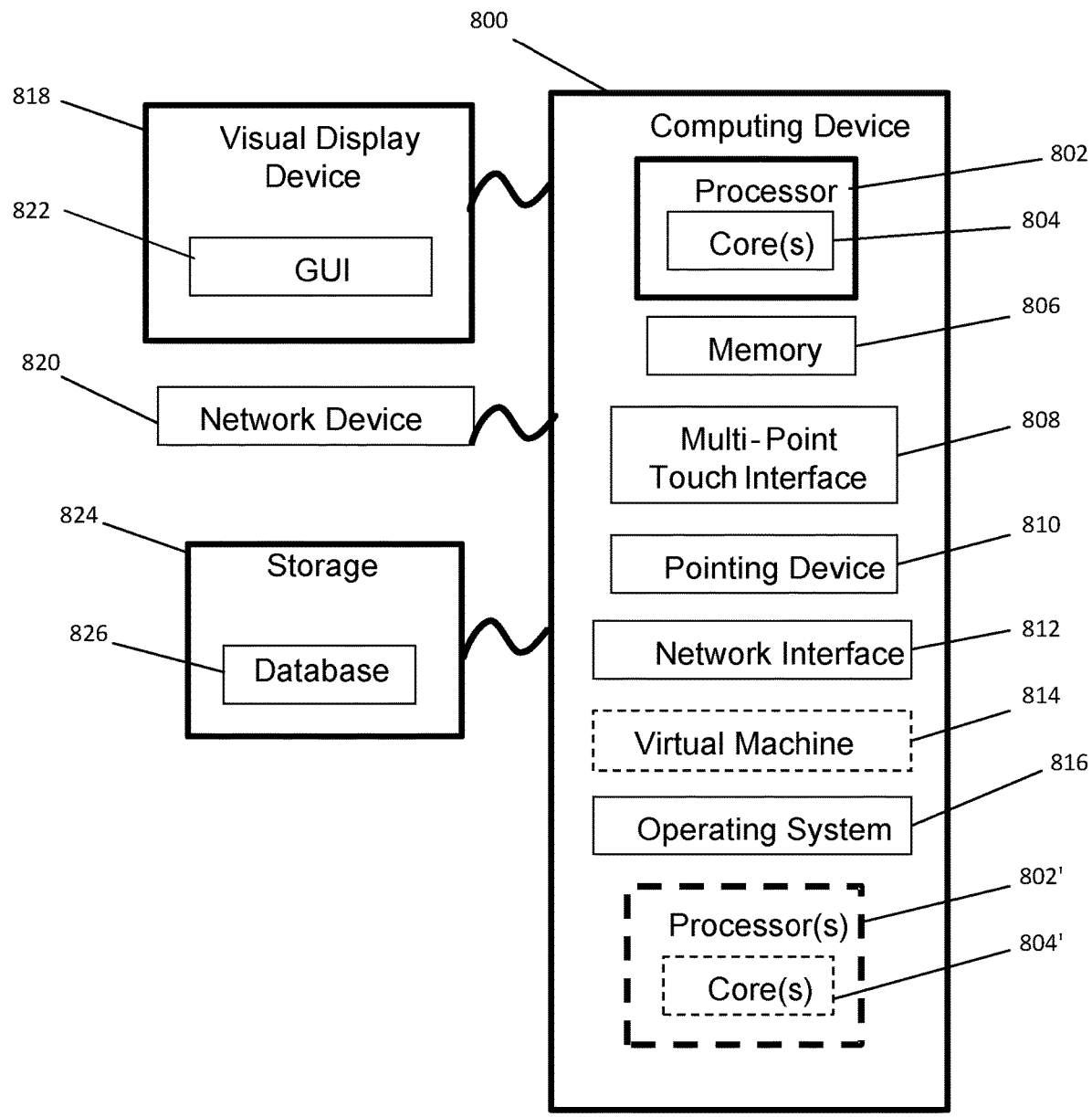
FIG. 8 is a block diagram of an exemplary computing device that may be used to implement exemplary embodiments described herein.

FIG. 8 is a block diagram of an exemplary computing device 800 that can be used to perform one or more steps of the methods provided by exemplary embodiments. For example, computing device 800 may be the client device 710, 720 and the server 730 as described in FIG. 7. The computing device 800 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 806 included in the computing device 800 can store computer-readable and computer-executable instructions or software for implementing exemplary embodiments. The computing device 800 also includes processor 802 and associated core 804, and optionally, one or more additional processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' can each be a single core processor or multiple core (804 and 804') processor.

Virtualization can be employed in the computing device 800 so that infrastructure and resources in the computing device can be shared dynamically. A virtual machine 814 can be provided to handle a process running on multiple processors so that the process appears to be using only one computing resource rather than multiple computing resources. Multiple virtual machines can also be used with one processor.

Memory 806 can include a computer system memory or random access memory, such as DRAM, SRAM, EDO RAM, and the like. Memory 806 can include other types of memory as well, or combinations thereof. An individual can interact with the computing device 800 through a visual display device 818, such as a touch screen display or computer monitor, which can display one or more user interfaces 822 for receiving data from the individual (e.g., order data and security data). The visual display device 818 can also display other aspects, elements and/or information or data associated with exemplary embodiments. The computing device 800 can include other I/O devices for receiving input from a individual, for example, a keyboard or another suitable multi-point touch interface 808, a pointing device 810 (e.g., a pen, stylus, mouse, or trackpad). The keyboard 808 and the pointing device 810 can be coupled to the visual display device 818. The computing device 800 can include other suitable conventional I/O peripherals.

The computing device 800 can also include one or more storage devices 824, such as a hard-drive, CD-ROM, or other computer readable media, for storing data and computer-readable instructions and/or software that implements exemplary embodiments of the automated storage and retrieval system as described herein, or portions thereof, which can be executed to generate user interface 822 on display 818. Exemplary storage device 824 can also store one or more databases for storing suitable information required to implement exemplary embodiments. The databases can be updated by an individual or automatically at a suitable time to add, delete or update one or more items in the databases. Exemplary storage device 824 can store one or more databases 826 for storing provisioned data, and other data/information used to implement exemplary embodiments of the systems and methods described herein.

The computing device 800 can include a network interface 812 configured to interface via one or more network devices 820 with one or more networks, for example, Local Area Network (LAN), Wide Area Network (WAN) or the Internet through a variety of connections including, but not limited to, standard telephone lines, LAN or WAN links (for example, 802.11, T1, T3, 86kb, X.25), broadband connections (for example, ISDN, Frame Relay, ATM), wireless connections, controller area network (CAN), or some combination of any or all of the above. The network interface 812 can include a built-in network adapter, network interface card, PCMCIA network card, card bus network adapter, wireless network adapter, USB network adapter, modem or another device suitable for interfacing the computing device 800 to a type of network capable of communication and performing the operations described herein. Moreover, the computing device 900 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 800 can run an operating system 816, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 816 can be run in native mode or emulated mode. In an exemplary embodiment, the operating system 816 can be run on one or more cloud machine instances.

The description is presented to enable a person skilled in the art to create and use a computer system configuration and related method and systems for automated storage and retrieval. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. An automated storage and retrieval system, the system comprising:
   a storage and retrieval device having a user interface;
   at least one storage location, the at least one storage location including a controller controlling a locking mechanism of the at least one storage location and coupled to the storage and retrieval device, wherein the at least one storage location is configured to interact with a mobile device operated by a user to detect a presence of the user at the at least one storage location;
   a storage and retrieval module, which, when executed:
      receives user authentication information from the user via the user interface;
      verifies identity of the user; and
      following a verification of the identity of the user, causes the controller controlling the locking mechanism of the at least one storage location to initiate a physical opening of the at least one storage location to enable the verified user to retrieve at least one item from the at least one storage location;
   wherein, the controller controlling the locking mechanism of the at least one storage location does not permit the locking mechanism to physically open the at least one storage location until the at least one storage location detects, via an interaction with the mobile device operated by the user, the presence of the verified user at the at least one storage location, and
   wherein the controller controlling the locking mechanism of the at least one storage location is permitted to physically open the locking mechanism of the at least one storage location to permit the verified user to retrieve the at least one item from the at least one storage location only in response to the at least one location detecting, via the interaction with the mobile device operated by the user, the presence of the verified user at the at least one storage location.

2. The system of claim 1, wherein the storage location is at least one of a locker and a location equipped with a lockable gate or opening.

3. The system of claim 1, wherein the at least one storage location further includes at least one proximity sensor to detect the arrival of the user.

4. The system of claim 3, wherein the at least one proximity sensor interacts with an application executing on the mobile device operated by the user.

5. The system of claim 1, wherein the dynamic storage and retrieval device further includes a robotic arm configured to retrieve the item in response to a command from the storage and retrieval module.

6. The system of claim 5, wherein the robotic arm is further configured to extend the item through the physical opening after retrieval.

7. A computing device-implemented method for automated storage and retrieval, the method comprising:
receiving user authentication information from a user via a user interface for a storage and retrieval device, the storage and retrieval device including at least one storage location having a controller controlling a locking mechanism of the at least one storage location and coupled to the dynamic storage and retrieval device, wherein the at least one storage location is configured to interact with a mobile device operated by the user to detect a presence of the user at the at least one storage location;
verifying identity of the user;
following the verifying of the identity of the user, causing the controller controlling the locking mechanism of the at least one storage location to initiate a physical opening of the at least one storage location to enable the verified user to retrieve at least one item from the at least one storage location; and
by the controller controlling the locking mechanism of the at least one storage location:
not permitting the locking mechanism of the at least one storage location to physically open until the at least one storage location detects, via an interaction with the mobile device operated by the user, the presence of the verified user at the at least one storage location; and
permitting the locking mechanism of the at least one storage location to physically open to permit the verified user to retrieve the at least one item from the at least one storage location only in response to the at least one storage location detecting, via an interaction with the mobile device operated by the user, the presence of the verified user at the at least one storage location.

8. The method of claim 7, wherein the storage location is at least one of a locker and a location equipped with a lockable gate or opening.

9. The method of claim 7, wherein the at least one storage location further includes at least one proximity sensor to detect the arrival of the user.

10. The method of claim 9, wherein the at least one proximity sensor interacts with an application executing on the mobile device operated by the user.

11. The method of claim 7, wherein the dynamic storage and retrieval device further includes a robotic arm configured to retrieve the item in response to a command from the storage and retrieval module.

12. The method of claim 11, wherein the robotic arm is further configured to extend the item through the physical opening after retrieval.

13. A non-transitory machine-readable medium storing instructions executable by a computing device, wherein execution of the instructions causes the computing device to implement a method for automated storage and retrieval, the method comprising:
receiving user authentication information from a user via a user interface for a storage and retrieval device, the storage and retrieval device including at least one storage location having a controller controlling a locking mechanism of the at least one storage location and coupled to the dynamic storage and retrieval device, wherein the at least one storage location is configured to interact with a mobile device operated by the user to detect a presence of the user at the at least one storage location;
verifying identity of the user;
following the verifying of the identity of the user, causing the controller controlling the locking mechanism of the at least one storage location to initiate a physical opening of the at least one storage location to enable the verified user to retrieve at least one item from the at least one storage location; and
by the controller controlling the locking mechanism of the at least one storage location:
not permitting the locking mechanism of the at least one storage location to physically open until the at least one storage location detects, via an interaction with the mobile device operated by the user, the presence of the verified user at the at least one storage location; and
permitting the locking mechanism of the at least one storage location to physically open to permit the verified user to retrieve the at least one item from the at least one storage location only in response to the at least one storage location detecting, via an interaction with the mobile device operated by the user, the presence of the verified user at the at least one storage location.

14. The non-transitory machine-readable medium of claim 13, further comprising instructions, wherein the storage location is at least one of a locker and a location equipped with a lockable gate or opening.

15. The non-transitory machine-readable medium of claim 13, wherein the at least one storage location further includes at least one proximity sensor to detect the arrival of the user.

16. The non-transitory machine-readable medium of claim 15, wherein the at least one proximity sensor interacts with an application executing on the mobile device operated by the user.

17. The non-transitory machine-readable medium of claim 13, wherein the dynamic storage and retrieval device further includes a robotic arm configured to retrieve the item in response to a command from the storage and retrieval module.

18. The non-transitory machine-readable medium of claim 17, wherein the robotic arm is further configured to extend the item through the physical opening after retrieval.

* * * * *